Nov. 22, 1955 — W. J. BOIVEN — 2,724,188

EXPANSIBLE GAUGE

Filed June 30, 1952

INVENTOR.
William J. Boiven.
BY A. R. McCrady
ATTORNEYS.

United States Patent Office 2,724,188
Patented Nov. 22, 1955

2,724,188
EXPANSIBLE GAUGE
William J. Boiven, Long Beach, Calif.

Application June 30, 1952, Serial No. 296,529

2 Claims. (Cl. 33—178)

(Granted under Title 35, U. S. Code (1952), sec. 266)

The invention described herein may be manufactured and used by or for the Government of the United States of America for governmental purposes without the payment of any royalties thereon or therefor.

This invention relates to an expansible mandrel for supporting a ring while it is being measured as to inside diameter, or otherwise processed.

An object of the invention is to provide a mandrel of a type suitable for use in the precise measurement of annular members such as the carbon sealing rings of steam turbines.

A further object is to provide a mandrel which is quickly adjustable to handle work pieces of different size.

Other objects and many of the attendant advantages of this invention will be readily appreciated as the same becomes better understood by reference to the following description.

Figure 1:
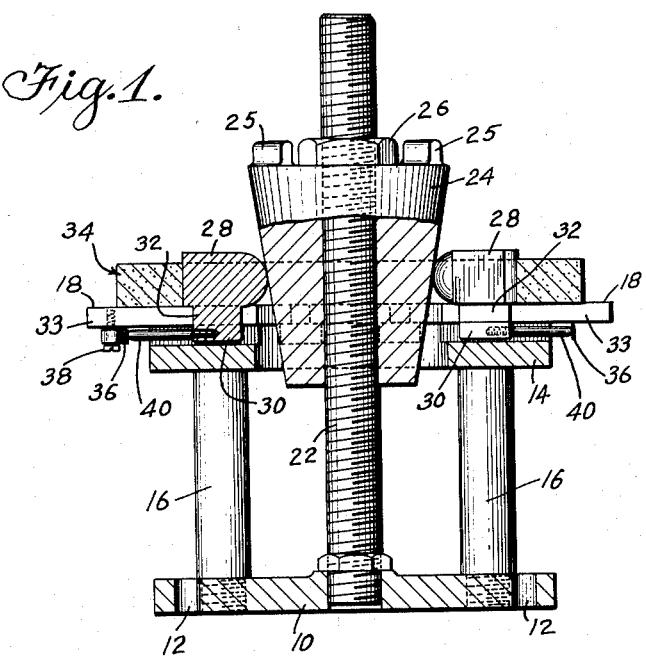
Fig. 1 is a view in vertical cross-section of apparatus embodying the invention.
Figure 3:
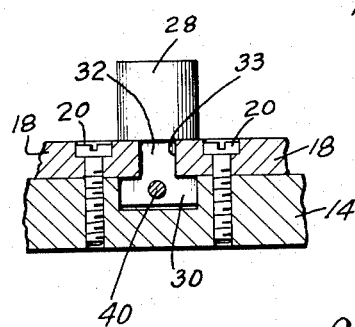
Fig. 3 is a sectional view taken on the line 3—3 of Fig. 2.
Figure 2:
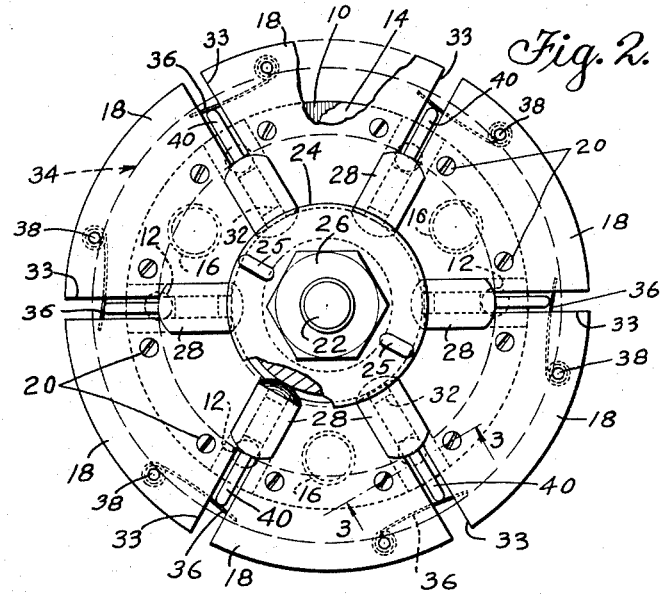
Fig. 2 is a plan view of the same.

The apparatus shown in Figs. 1–3 comprises a base plate 10 having bolt-holes 12 whereby it may be secured to any suitable mounting such as the head of a lathe. An annular table member 14 is supported in spaced relation to plate 10 by a plurality of studs 16, and in turn carries a face plate made up of a plurality of spaced segments 18 which are secured to member 14 by screws 20.

A center post 22 is fixed to plate 10 and extends to a point beyond face plate 18, being threaded over most of its length. Threadedly mounted on post 22 are a conical expander 24 and a lock nut 26. The conical surface of expander 24 is accurately machined, for a purpose to be described. The expander is rotatable by means of finger lugs 25.

The upper or forward face of member 14 is formed with radial grooves in which are slidably mounted a plurality of pairs of diametrically opposed slides. As will be seen in Fig. 3, each slide comprises, in addition to a gage element 28 which rides on the surface of face plate 18, a carrier element comprising a flange 30 which rides in the radial groove in member 14 and a web 32 which rides in the slot 33 between adjacent segments 18.

The inner end of each gage element is rounded to a part-spherical shape as shown, so as to have point contact with the surface of expander 24. Its outer end is part-cylindrical, so as to have line contact with the work 34, which may be a carbon sealing ring of a steam turbine or any annular member the inner diameter of which is to be accurately gauged, such as a split piston ring.

The slides are yieldingly urged inwardly of the face plate by any suitable means, such as leaf springs 36 held in place by studs 38 and pressing against the outer ends of pins 40 in the flanges 30 of the carrier elements of the slides.

In the operation of the device, the expander 24 will first be screwed down, forcing gage elements 28 outwardly until their outer ends define a circle of the desired diameter for the particular ring to be processed. The lock nut 26 having first been set, the diameter of the circle may be checked by micrometer or otherwise, after which the ring 34 is put in place and the clearance between it and the several gage elements may be determined by a feeler gage; any difference between the clearances at the respective pairs of opposed gage elements will indicate out-of-roundness, while excess clearance at all of the gage elements will indicate too-great diameter, due to wear or other cause. Alternatively, the work may be put in place first, and the expander 24 screwed down until the gage elements contact it, after which the work may be removed and the diameter of the resulting circle measured.

Figure 4:
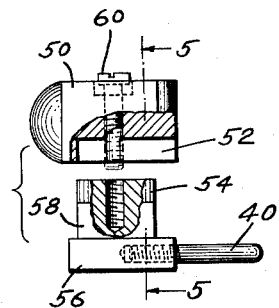
Fig. 4 is a view in side elevation of a modified form of slide.
Figure 5:
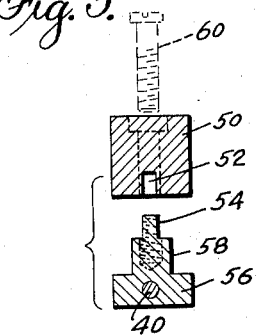
Fig. 5 is a sectional view taken on the line 5—5 of Fig. 4.

In the form of slide shown in Figs. 4 and 5, the gage element 50 is generally similar to the gage elements 28 of Figs. 1–3, but is formed separate from the carrier element of the slide in order that it may be readily replaced by other gage elements of greater or lesser length, so as to adapt the apparatus to work pieces differing greatly in internal diameter. The gage element is accordingly formed on its under surface with a longitudinal milled groove 52 into which fits a flange 54 of the carrier element of the slide. Said carrier element comprises a flange 56 and a web 58 generally similar to members 30 and 32 of Figs. 1–3. The two elements are detachably secured together by means such as a capscrew 60 which extends through a vertical bore in element 50 and is threaded into an aligned bore in the carrier element. The operation of this form of slide is the same as that shown in Figs. 1–3 except as above indicated.

Obviously many modifications and variations of the present invention are possible in the light of the above teachings. It is therefore to be understood that within the scope of the appended claims the invention may be practiced otherwise than as specifically described.

What is claimed is:

1. A gauging device comprising a table having an annular plane surface formed with radial grooves, a face plate fixed to said surface and formed of a plurality of segments spaced from each other to form radial grooves overlying said first mentioned grooves to form channels of T-shaped cross section, a plurality of slides each comprising a flanged portion fitting slidably in one of said channels and a gage element having a part-cylindrical outer end and a part-spherical inner end, yielding means urging said slides inwardly, and an axially movable frusto-conical expander contacting said inner ends for moving the slides outwardly.

2. The invention defined in claim 1 wherein said expander is formed with a threaded axial bore, and comprising in addition a fixed base, and a bolt mounted on said base and threadedly engaging said bore.

(References on following page)

References Cited in the file of this patent

UNITED STATES PATENTS

| | | |
|---|---|---|
| 45,364 | Underhill | Dec. 6, 1864 |
| 185,159 | Bartlett | Dec. 12, 1876 |
| 325,315 | Brown | Sept. 1, 1885 |
| 749,202 | Klay | Jan. 12, 1904 |
| 1,241,319 | Wiley | Sept. 25, 1917 |
| 1,404,989 | Marcy | Jan. 31, 1922 |
| 1,417,001 | Volis | May 23, 1922 |
| 1,477,531 | Bath | Dec. 18, 1923 |
| 2,134,372 | Olson | Oct. 25, 1938 |
| 2,210,124 | Parrish | Aug. 6, 1940 |
| 2,496,545 | Kraemer | Feb. 7, 1950 |

FOREIGN PATENTS

| | | |
|---|---|---|
| 655,838 | Great Britain | Aug. 1, 1951 |